US011123160B2

(12) United States Patent
Richard (10) Patent No.: US 11,123,160 B2
(45) Date of Patent: Sep. 21, 2021

(54) SET OF COMPONENTS FOR DENTAL PROSTHETIC RESTORATION

(71) Applicant: ANTHOGYR, Sallanches (FR)

(72) Inventor: Hervé Richard, Notre Dame de Bellecombe (FR)

(73) Assignee: ANTHOGYR, Sallanches (FR)

( * ) Notice: Subject to any disclaimer, the term of this patent is extended or adjusted under 35 U.S.C. 154(b) by 304 days.

(21) Appl. No.: 16/474,608

(22) PCT Filed: Jan. 23, 2018

(86) PCT No.: PCT/IB2018/050398
§ 371 (c)(1),
(2) Date: Jun. 28, 2019

(87) PCT Pub. No.: WO2018/138630
PCT Pub. Date: Aug. 2, 2018

(65) Prior Publication Data
US 2021/0128278 A1    May 6, 2021

(30) Foreign Application Priority Data
Jan. 26, 2017   (FR) ..................... 17 50654

(51) Int. Cl.
*A61C 8/00*   (2006.01)
(52) U.S. Cl.
CPC .......... *A61C 8/0012* (2013.01); *A61C 8/0062* (2013.01); *A61C 8/0063* (2013.01); *A61C 8/0068* (2013.01)

(58) Field of Classification Search
CPC ... A61C 8/0012; A61C 8/0062; A61C 8/0063; A61C 8/0068; A61C 8/0065; A61C 8/0048; A61C 8/0022; A61C 8/0056; A61C 13/2656
USPC .................................. 433/172–176
See application file for complete search history.

(56) References Cited

U.S. PATENT DOCUMENTS

| | | | | |
|---|---|---|---|---|
| 5,733,122 A * | 3/1998 | Gordon | ................. | A61C 8/005 433/172 |
| 5,782,918 A * | 7/1998 | Klardie | ................. | A61C 8/0066 606/60 |
| 7,845,946 B2 * | 12/2010 | Brajnovic | ............ | A61C 8/0048 433/174 |
| 8,167,619 B2 * | 5/2012 | Vachtenberg | ........ | A61C 8/0089 433/173 |
| 9,265,591 B1 * | 2/2016 | Gittleman | ............ | A61C 8/0001 |
| 2006/0014120 A1 * | 1/2006 | Sapian | ................. | A61C 8/0065 433/173 |

(Continued)

FOREIGN PATENT DOCUMENTS

DE    202008003960 U1    6/2008
KR       20130097820       4/2013

(Continued)

*Primary Examiner* — Matthew M Nelson
(74) *Attorney, Agent, or Firm* — William H. Eilberg (57) ABSTRACT

A set of components for dental prosthetic restoration includes a ceramic dental implant having an internal connecting receiving space. An internally threaded insert is added into the internal connecting receiving space of the dental implant, and rotatably indexed. It is held by a fixing part forming an axial abutment opposing an extraction of the internally threaded insert out of the inner connection receiving space.

18 Claims, 7 Drawing Sheets

(56) References Cited

U.S. PATENT DOCUMENTS

| | | | |
|---|---|---|---|
| 2008/0241790 A1* | 10/2008 | Gittleman | A61C 8/0065 433/174 |
| 2008/0261174 A1* | 10/2008 | Gittleman | A61C 8/0048 433/172 |
| 2009/0298013 A1* | 12/2009 | Baruc | A61C 8/0065 433/174 |
| 2011/0123949 A1* | 5/2011 | Wolf | A61C 8/005 433/173 |
| 2012/0251979 A1 | 10/2012 | Karim | |
| 2013/0164708 A1 | 6/2013 | Streff | |
| 2014/0178836 A1* | 6/2014 | Haus | A61K 6/802 433/173 |
| 2015/0140508 A1* | 5/2015 | Nike | A61C 8/005 433/172 |
| 2016/0193020 A1 | 7/2016 | Fix | |
| 2017/0224447 A1* | 8/2017 | Richard | A61C 13/09 |
| 2018/0206945 A1* | 7/2018 | Haus | A61C 8/0062 |
| 2019/0365510 A1* | 12/2019 | Richard | A61C 8/0048 |
| 2021/0128278 A1* | 5/2021 | Richard | A61C 8/0062 |

FOREIGN PATENT DOCUMENTS

| | | | | |
|---|---|---|---|---|
| WO | 2011036268 A2 | 3/2011 | | |
| WO | WO-2011036268 A3 * | 7/2011 | | A61C 8/0063 |

* cited by examiner

SET OF COMPONENTS FOR DENTAL PROSTHETIC RESTORATION

TECHNICAL FIELD OF THE INVENTION

The present invention relates to the field of dental prosthetic restoration, and relates more particularly to a dental implant made of ceramic.

Dental implants are known which are made of metallic material, such as titanium or a titanium alloy, and which are intended to be fitted in the upper jawbone or lower jawbone of a patient, extending along a first longitudinal axis between a proximal end and a distal end, with an inner connection seat extending from the distal end in the direction of the proximal end.

The inner connection seat is generally threaded internally over part of its length in order to receive, by screwing, a fixing screw intended to ensure definitive fixation of a dental component such as an abutment or a transfixed prosthesis core having an outer form substantially in the shape of a tooth. The fixing screw routinely has an outer thread of metric profile.

While the formation of an inner thread in the inner connection seat of a metallic dental implant does not pose too much of a problem, it is quite a different matter in the specific case of a dental implant made of ceramic.

The machining of the ceramic is in fact extremely lengthy on account of its high degree of hardness. In addition, the thread shape has to be modified with respect to a standard (metric) thread in order to limit the stress peaks that would result from machining with very small radii, especially at the thread root (risks of fissures starting to form). The radius for a thread of metric profile is in fact very small in respect of the pitch. A thread adapted to ceramic thus requires a larger pitch, which increases the risks of accidental loosening of the fixing screw, and also takes up more space radially.

The document WO 2011/036268 A2 describes the preamble of claim 1.

DISCLOSURE OF THE INVENTION

A problem set by the present invention is to facilitate the production of a ceramic dental implant, while reducing the risks of weakening of the implant and the risks of a fixing screw coming loose.

To achieve these aims and others, the invention proposes a set of components for dental prosthetic restoration, comprising a ceramic dental implant intended to be fitted in the upper jawbone or lower jawbone of a patient, extending along a first longitudinal axis between a proximal end and a distal end, with an inner connection seat extending from the distal end in the direction of the proximal end; according to the invention:

the inner connection seat has at least one portion of non-circular cross section, the set comprises an internally threaded insert, configured in such a way as to be mounted in the portion of non-circular cross section of the inner connection seat of the dental implant by being rotationally indexed therein about the first longitudinal axis, the set comprises a fixing piece with a first axial through-passage having a cross section of sufficient dimensions for the passage of a threaded element intended to cooperate by screwing with the internally threaded insert, configured to engage in a radial seat formed in the lateral wall of the inner connection seat of the dental implant in such a way as to form an axial abutment opposing an extraction of the internally threaded insert from the portion of non-circular cross section of the inner connection seat.

It is thus possible to produce, in the ceramic implant, an inner connection seat having a lateral wall with no inner thread, the thread (preferably metric) for a fixing screw being provided by the internally threaded insert which is indexed in rotation and is retained in the inner connection seat. The implant thus has less risk of incipient rupture.

Depending on the position of the dental implant fixed in the jaw of the patient, it is often necessary to carefully adjust the location of the coronal emergence of the well allowing the passage of the fixing screw. The aim is to be able, despite the shortage of space available in the mouth of the patient, to access the fixing screw using a screwing tool. It is also important for the coronal emergence of the access well to be positioned away from the parts of the tooth that are active during chewing (for example the cusps).

To address this problem, provision may preferably be made that the set additionally has a transfixed dental prosthesis core of ceramic comprising a second through-passage formed by first and second successive passage portions, said first passage portion extending from a proximal end of the transfixed dental prosthesis core along a second longitudinal axis, and said second passage portion continuing the first passage portion such that the first and second passage portions form a non-zero angle between them.

The transfixed dental prosthesis core of ceramic (machined from a ceramic block or produced by sintering of a ceramic powder in particular) may, if appropriate, be coated by the prosthetist with one or more very light texturing or coloring layers in order to yield an appearance as close as possible to that of a natural tooth. In combination with the ceramic dental implant, the transfixed dental prosthesis core of ceramic forms a set providing a visual aspect very close to that of a real tooth, with no metal part capable of inducing unnatural shades.

The angled nature of the second through-passage allows the coronal emergence of the access well to be positioned away from the parts of the tooth that are active during chewing (cusps).

A second angled through-passage allowing the fixing screw to be inserted and routed along a curved trajectory through the transfixed dental prosthesis core of ceramic requires a fairly significant removal of material from the core of the prosthesis, which greatly reduces the mechanical strength thereof.

Moreover, in a first step, the practitioner has to arrange the transfixed dental prosthesis core of ceramic on the dental implant in the patient's mouth before, in a second step, inserting the fixing screw through the transfixed dental prosthesis core of ceramic, and then, in a third step, commencing to screw it in. There are therefore considerable risks of the transfixed dental prosthesis core of ceramic and/or the fixing screw being lost and/or accidentally swallowed by the patient.

To solve this problem, provision may advantageously be made that:

the set comprises a fixing screw having a screw head from which there extends a screw shank provided with a threaded portion intended to be received by screwing in said internally threaded insert, the fixing piece extends between a first end, intended to engage in the inner connection seat of the dental implant, and a second end, the first passage portion of the transfixed dental prosthesis core has transverse dimensions permitting reception of the second end of the fixing piece and the screw head by axial penetration along the second longitudinal axis from the proximal end of the transfixed dental prosthesis core, the screw head and the second end of the fixing piece are configured so as to cooperate in order to retain the transfixed dental prosthesis core on the dental implant, preferably by radial expansion of the second end of the fixing piece.

The fixing screw does not need to pass through the second passage portion of the second angled through-passage, and therefore the latter can have reduced dimensions in order to limit the risks of weakening of the transfixed dental prosthesis core.

In a first step during his maneuvers, the practitioner engages the fixing screw in the internally threaded insert, which is already retained in the inner connection seat by the fixing piece. Then, in a second step, he engages the transfixed dental prosthesis core on the second end of the fixing piece and the screw head. The transfixed dental prosthesis core is then retained temporarily on the implant by its engagement on the second end of the fixing piece and the screw head. Finally, in a third step, the practitioner finishes fixing the transfixed dental prosthesis core by screwing in the fixing screw. During these maneuvers, the risks of the transfixed dental prosthesis core of ceramic and/or the fixing screw being lost and/or swallowed are reduced, since at each step a sub-assembly is produced consisting or elements that are attached to each other at least provisionally.

Advantageously, the second passage portion of the dental prosthesis core can have transverse dimensions which are smaller than those of the first passage portion but which are sufficient for passage of a tool for driving the fixing screw in rotation along the first longitudinal axis.

Preferably, a relative movement of translation of the fixing screw toward the proximal end of the dental implant along the first longitudinal axis causes a radial expansion of the second end of the fixing piece.

This radial expansion permits simple and satisfactory fixing of the transfixed dental prosthesis core on the dental implant.

To further improve this fixation, the dental prosthesis core can have an annular groove intended to receive the second end of the fixing piece.

According to a first possibility, a relative movement of translation of the fixing screw toward the proximal end of the dental implant along the first longitudinal axis can cause a radial expansion of the second end of the fixing piece in order to engage the second end of the fixing piece in the annular groove.

According to a second possibility, when the first passage portion receives the second end of the fixing piece and the screw head by axial penetration along the first longitudinal axis, the second end of the fixing piece can engage in the annular groove reversibly, preferably with a snap-fit action.

In the context of the second possibility, after the second end of the fixing piece has been received in the groove, the screw head can come to bear axially against the second end of the fixing piece and can oppose an extraction of the second end of the fixing piece from the annular groove.

In the context of the second possibility, provision may alternatively be made that, after the second end of the fixing piece has been received in the groove, a relative movement in translation of the fixing screw toward the proximal end of the dental implant along the first longitudinal axis causes a radial expansion of the second end of the fixing piece.

The snap-fit action, obtained when the first passage portion receives the second end of the fixing piece and the screw head by axial penetration along the first longitudinal axis, does not therefore have to be too strong, in order to allow the practitioner to withdraw and reposition it without great effort. It will nonetheless be possible for the transfixed dental prosthesis core to be reliably fixed on the dental implant by the subsequent radial expansion of the second end of the fixing piece, which expansion is caused by the fixing screw being screwed in.

Advantageously, the annular groove and/or the second end of the fixing piece can have respective contact surfaces which are configured such that the radial expansion of the second end of the fixing piece induces, along the first longitudinal axis, a pressing of the proximal end of the dental prosthesis core toward the distal end of the dental implant.

Such axial pressing can effectively limit the risks of bacteria entering and growing at the interfaces between the transfixed dental prosthesis core and the dental implant (and the optional intermediate components).

Preferably, provision may be made that:

the first end of the fixing piece has a first set of longitudinal fins with free distal parts, the second end of the fixing piece has a second set of longitudinal fins with free distal parts, the first and second sets of longitudinal fins are defined by a plurality of longitudinal slits extending over only part of the length of the fixing piece and starting alternately from the first end and from the second end, said slits all extending along a same intermediate axial portion of the fixing piece.

Such a fixing piece permits snap-fitting at each of its ends. To obtain straightforward snap-fitting, it is however necessary that the fins have a sufficient length to facilitate their flexion: this leads to an increase in the axial size of the fixing piece, and this size is then incompatible with the dental field, where space is limited. The provision of slits defining the first and second sets of longitudinal fins, in alignment with the same intermediate axial portion of the fixing piece, makes it possible to substantially reduce the axial size of the fixing piece while at the same time affording a straightforward and effective snap-fit action.

According to a first possibility, the first end of the fixing piece can be received in the radial sear irreversibly, preferably with a snap-fit action. The risks of accidental separation of the fixing piece and of the dental implant are thereby reduced.

According to a second possibility, the first end of the fixing piece can be received in the radial seat reversibly, preferably with a snap-fit action. The fixing piece can then be subsequently extracted from the dental implant if necessary.

In the context of this second possibility, the first end of the fixing piece and the internally threaded insert can be configured such that, when the internally threaded insert is bearing axially against the first end of the fixing piece, this bearing opposes a withdrawal of the first end of the fixing piece from the radial seat. The fixing piece and the dental implant are thus easily rendered inseparable with the aid of the fixing screw.

Alternatively, still in the context of the second possibility, a relative movement in translation of the internally threaded insert toward the distal end of the dental implant along the first longitudinal axis can cause a radial expansion of the first end of the fixing piece.

Preferably, the dental prosthesis core comprises a proximal end configured to bear directly against the distal end of the dental implant. The number of components is thus limited, and a ceramic-on-ceramic contact is obtained, which avoids phenomena of premature wear.

Advantageously, the set can have means for rotational indexing of the dental prosthesis core and of the dental implant about the first longitudinal axis.

According to a first possibility, the dental prosthesis core can have an outer form substantially in the shape of a tooth, obtained preferably by machining of a ceramic block or produced by sintering of a ceramic powder. A dental prosthesis core of this kind may, if appropriate, be coated by the prosthetist with one or more very light texturing or coloring layers in order to yield an appearance as close as possible to that of a natural tooth.

According to another possibility, the dental prosthesis core can be a ceramic block which has a substantially cylindrical or prismatic outer shape and which is intended to be machined so as to obtain an outer form substantially in the shape of a tooth (as illustrated, for example, in the documents KR 10-2013-0097820, US 2012/0251979 and EP 2 837 357).

BRIEF DESCRIPTION OF THE DRAWINGS

Other aims, features and advantages of the present invention will become clear from the following description of particular embodiments, with reference being made to the attached figures, in which.

DESCRIPTION OF PREFERRED EMBODIMENTS

FIGS. 1 to 7 illustrate a first embodiment of a set 1 according to the present invention.

Figure 1:
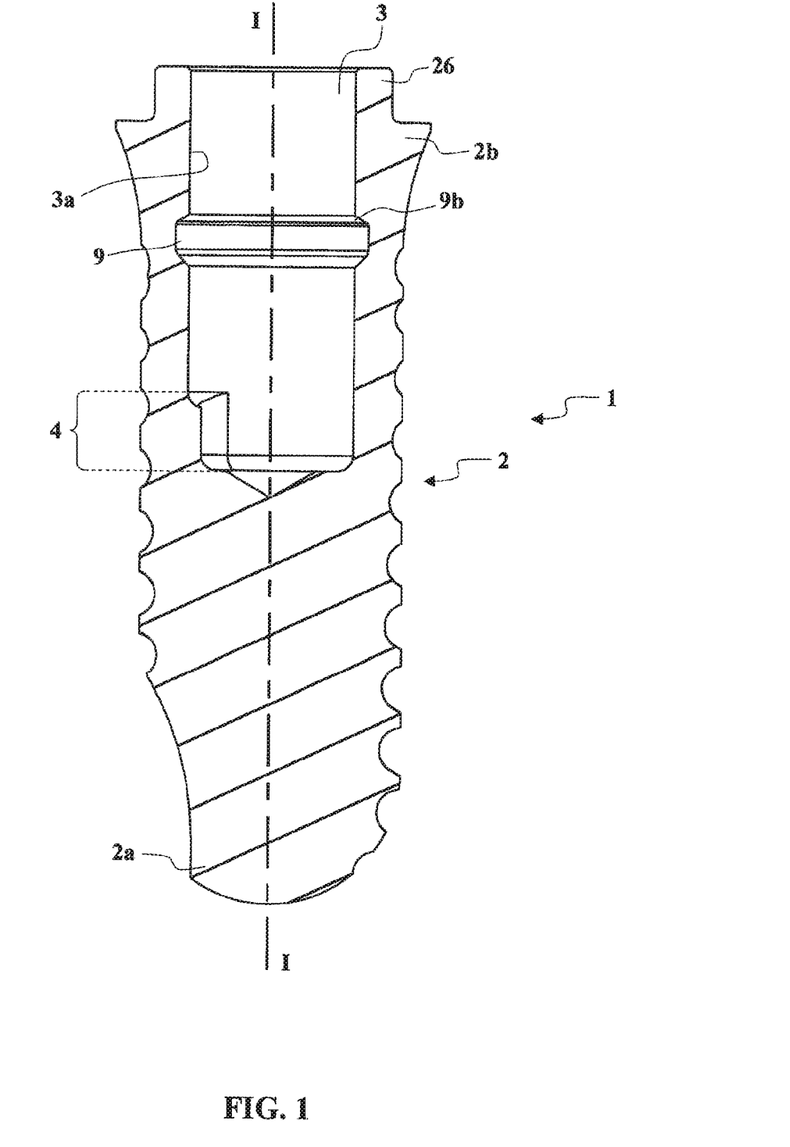
FIG. 1 is a longitudinal sectional view of a ceramic implant forming part of a first embodiment of a set according to the present invention.

This set 1 has in the first instance a ceramic dental implant 2, as illustrated in FIG. 1, intended to be fitted in the upper jawbone or lower jawbone of a patient. The dental implant 2 extends along a first longitudinal axis I-I between a proximal end 2a and a distal end 2b, with an inner connection seat 3 extending from the distal end 2b in the direction of the proximal end 2a.

The inner connection seat 3 has at least one portion 4 of non-circular cross section.

Figure 2:
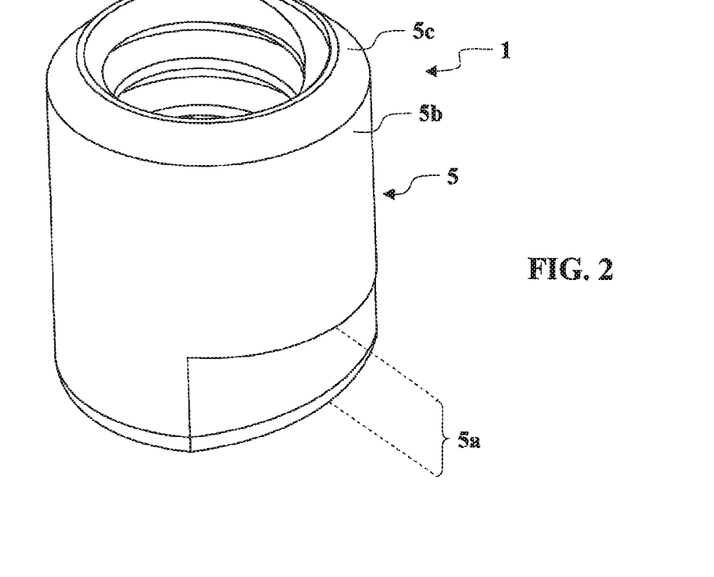
FIG. 2 is a perspective view of an internally threaded insert forming part of the first embodiment of a set according to the present invention.
Figure 3:
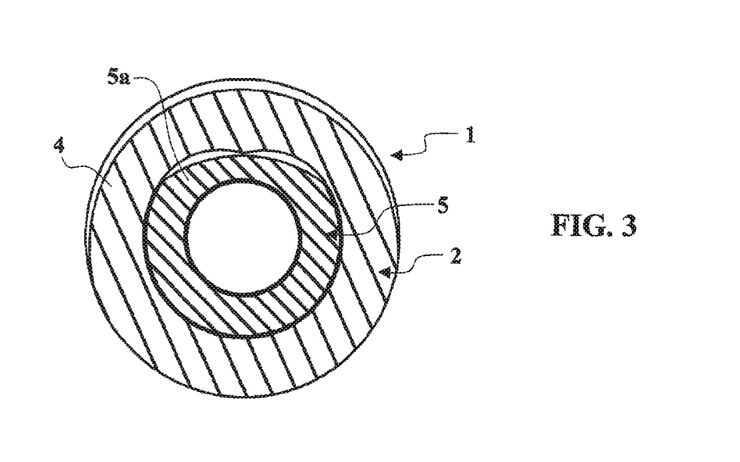
FIG. 3 is a transverse sectional view of the ceramic implant from FIG. 1, in which the internally threaded insert from FIG. 2 is housed.

The set 1 comprises in the second instance an internally threaded insert 5, as illustrated in FIG. 2, configured in such a way as to be mounted in the portion 4 of non-circular cross section of the inner connection seat 3 of the dental implant 2 (see FIG. 6) by being indexed in rotation there about the first longitudinal axis I-I. More precisely, the internally threaded insert 5 has a proximal portion 5a of non-circular cross section.

The shape of the cross section of the proximal portion 5a is inscribed within the shape of the non-circular cross section of the portion 4 of the dental implant 2, so as to cooperate in order to rotationally index the internally threaded insert 5 about the first longitudinal axis I-I in the inner connection seat 3 of the dental implant 2. The shapes of the portion 4 of non-circular cross section and of the proximal portion 5a can be seen more particularly in FIG. 3, which is a section of the implant 2 and of the internally threaded insert 5 along the transverse plane P indicated in FIG. 6.

Figure 4:
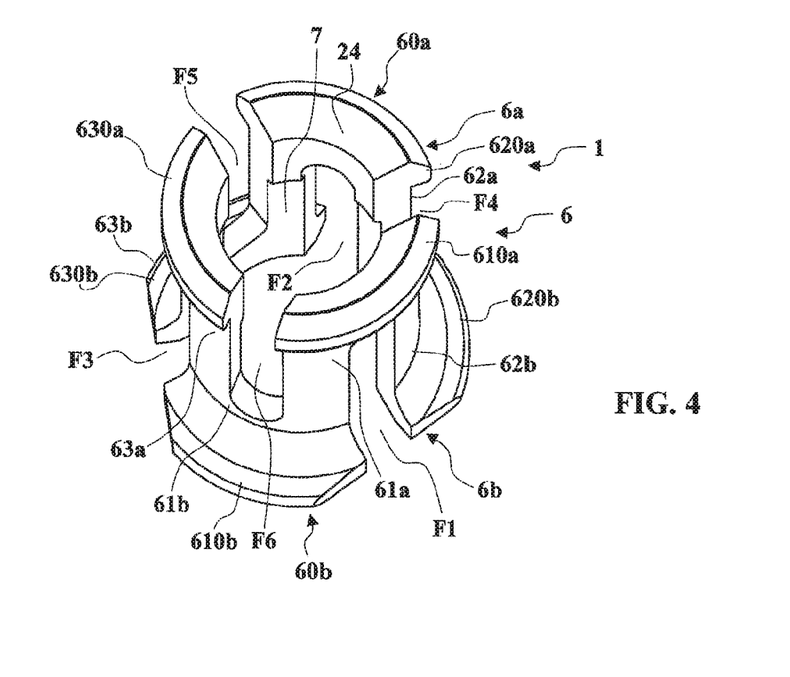
FIG. 4 is a perspective view of a fixing piece forming part of the first embodiment of a set according to the present invention.
Figure 5:
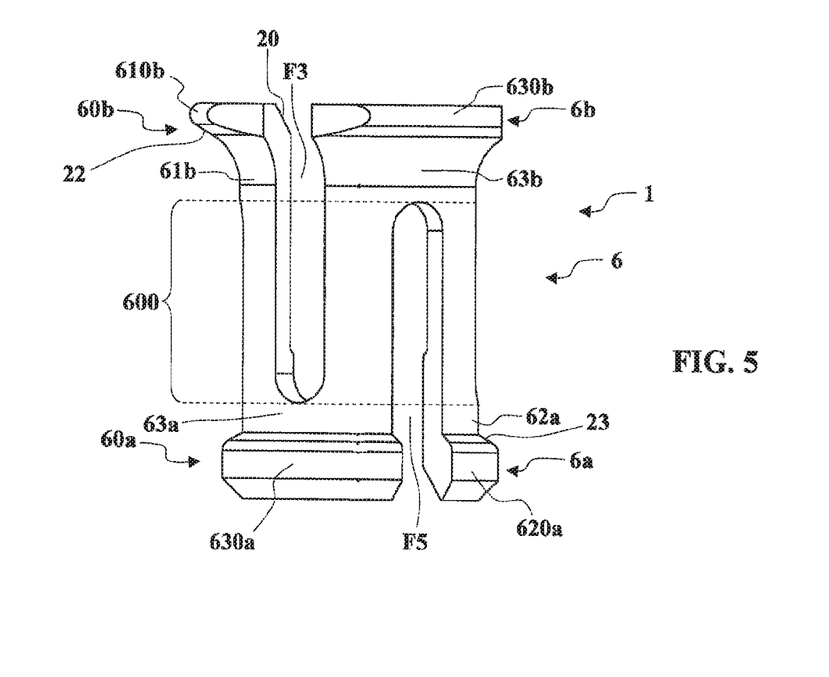
FIG. 5 is a side view of the fixing piece from FIG. 4.
Figure 6:
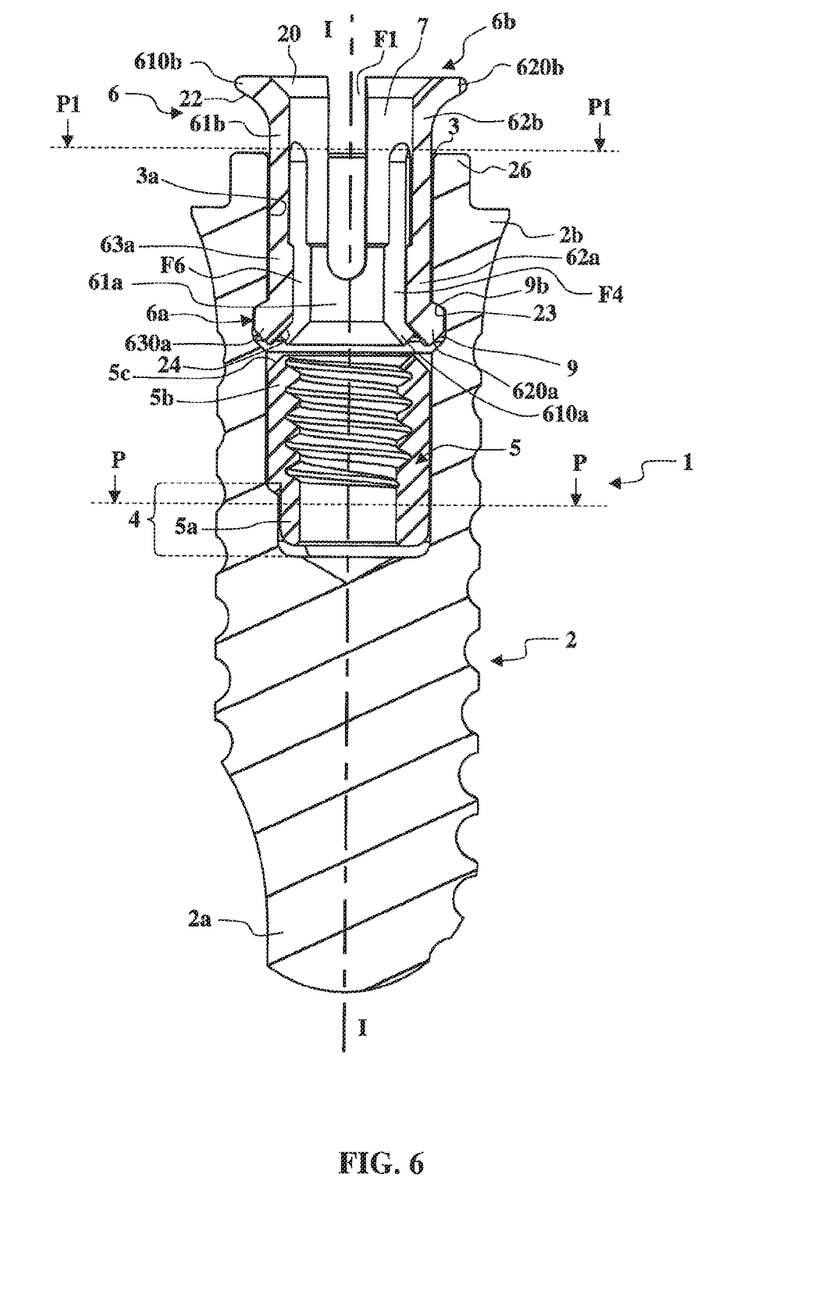
FIG. 6 is a longitudinal sectional view of the first embodiment of a set according to the present invention.

The set 1 comprises in the third instance a fixing piece 6, which can be seen more particularly in FIGS. 4 and 5, with a first axial through-passage 7 having a cross section with dimensions which are sufficient for passage of a threaded element 8 (see FIG. 7) intended to cooperate by screwing with the internally threaded insert 5. The fixing piece 6 is configured to engage in a radial seat 9 formed in the lateral wall 3a of the inner connection seat 3 of the dental implant 2, in such a way as to form an axial abutment opposing an extraction of the internally threaded insert 5 from the portion 4 of non-circular cross section of the inner connection seat 3.

The fixing piece 6 extends between a first end 6a, intended to engage in the inner connection seat 3 of the dental implant 2, and a second end 6b.

The first end 6a of the fixing piece 6 has a first set 60a of longitudinal fins 61a to 63a with free distal parts 610a to 630a. The second end 6b of the fixing piece 6 has a second set 60b of longitudinal fins 61b to 63b with free distal parts 610b to 630b.

The first 60a and second 6 sets of longitudinal fins 61a to 63a and 61b to 63b are defined by a plurality of longitudinal slits F1 to F6 extending over only part of the length of the fixing piece 6 and starting alternately from the first end 6a and from the second end 6b, said slits F1 to F6 all extending along a same intermediate axial portion 600 of the fixing piece 6 (FIG. 5).

Figure 7:
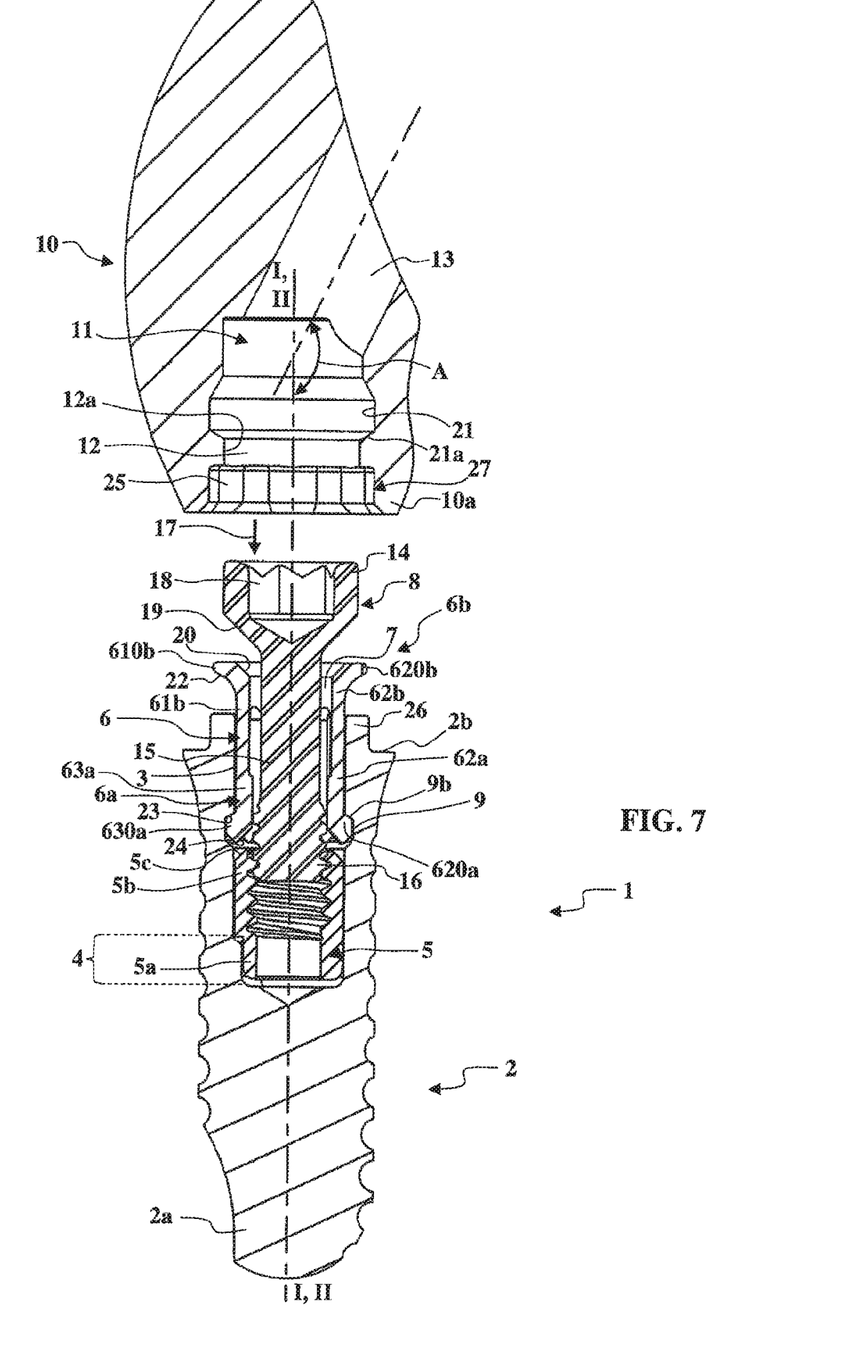
FIG. 7 is a longitudinal sectional view of the first embodiment of a set according to the present invention and of a transfixed dental prosthesis core intended to be mounted and fixed on the set.

The set 1 additionally has a transfixed dental prosthesis core 10 of ceramic as illustrated in FIG. 7. This dental prosthesis core 10 has an outer form substantially in the shape of a tooth, obtained preferably by machining of a ceramic block or produced by sintering of a ceramic powder.

The dental prosthesis core 10 comprises a second through-passage 11 formed by first 12 and second 13 successive passage portions, said first passage portion 12 extending from a proximal end 10a of the transfixed dental prosthesis core 10 along a second longitudinal axis II-II, and said second passage portion 13 continuing the first passage portion 12 such that the first 12 and second 13 passage portions form a non-zero angle A between them.

It will be seen from FIG. 1 that the set 1 additionally comprises a fixing screw 8 having a screw head 14 from which there extends a screw shank 15 provided with a threaded portion 16 intended to be received by screwing in said internally threaded insert 5.

The first passage portion 12 in the transfixed dental prosthesis core 10 has transverse dimensions permitting reception of the second end 6b of the fixing piece 6 and the screw head 14 by axial penetration along the second longitudinal axis II-II (in a movement of translation illustrated by the arrow 17, from the proximal end 10a of the transfixed dental prosthesis core 10. The screw head 14 and the second end 6b of the fixing piece 6 are configured so as to cooperate in order to retain the transfixed dental prosthesis core 10 on the dental implant 2 (configuration illustrated in FIG. 8).

The second passage portion 13 in the dental prosthesis core 10 has transverse dimensions which are smaller than those of the first passage portion 12 but which are sufficient for passage of a tool for driving the fixing screw 8 in rotation along the first longitudinal axis I-I.

Here, the screw head 14 has a hollow screw socket 18 of non-circular cross section (here hexagonal) with dimensions smaller than the overall dimensions of the screw head 14. To drive the fixing screw 8, it is possible, for example, to use a tool permitting angulation of the screw head 14 during screwing or unscrewing, as is described in the document EP 2 607 722, for example.

It will be noted in FIG. 7 that the screw head 14 has a frustoconical lower face 19. Any other shape of the lower face 19 providing gradual widening of the cross section of the screw head 14 is conceivable. Thus, a relative movement of the fixing screw 6 in translation toward the proximal end 2a of the dental implant 2 along the first longitudinal axis I-I causes a radial expansion of the first end 6b of the fixing piece 6.

It will be noted that the second end 6b of the fixing piece 6 has a substantially frustoconical seat 20 substantially complementing the frustoconical lower face 19. This complementarity makes it possible to distribute the stresses via surface contact between the screw head 14 and the second end 6b.

More particularly here, the radial expansion of the second end 6b of the fixing piece 6 permits penetration, or permits better penetration, of the second end 6b (the distal parts 610b to 630b of the longitudinal fins 61b to 63b) of the fixing piece 6 into an annular groove 21 formed in the first passage portion 12 of the dental prosthesis core 10.

Alternatively, if the first passage portion 12 of the dental prosthesis core 10 has no annular groove 21, the radial expansion of the second end 6b of the fixing piece 6 allows the free distal parts 610b to 630b of the longitudinal fins 61b to 63b to be pressed so as to bear against the lateral wall 12a of the first passage portion 12.

In the embodiment illustrated in FIGS. 1 to 8, when the first passage portion 12 receives the second end 6b of the fixing piece 6 and the screw head 14 by axial penetration along the first longitudinal axis I-I, the second end 6b of the fixing piece 6 engages in the annular groove 21 reversibly with a snap-fit action. This snap-fit action permits provisional but satisfactory fixing of the dental prosthesis core 10 on the dental implant 2 before the practitioner tightens the fixing screw 8.

Figure 8:
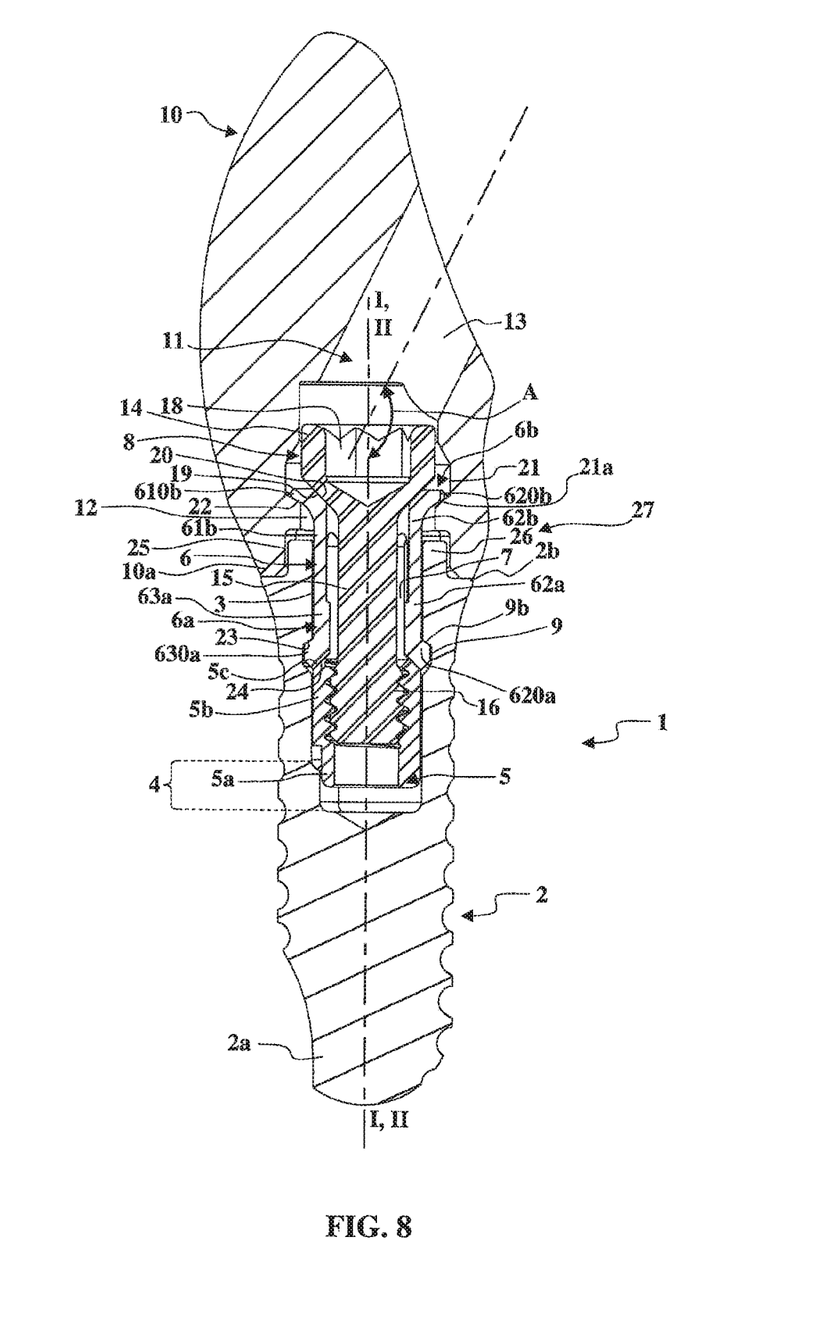
FIG. 8 is a longitudinal sectional view of the first embodiment of a set according to the present invention, on which a transfixed dental prosthesis core is mounted and fixed.

In order to fix the dental prosthesis core 10 on the dental implant 2, after the second end 6b of the fixing piece 6 has been received in the annular groove 21, the screw head 14 comes to bear axially against the second end 6b of the fixing piece 6 and opposes a movement of the free distal parts 610b to 630b of the longitudinal fins 61b to 63b toward the first longitudinal axis I-I (FIG. 8). The second end 6b thus remains snap-fitted in the annular groove 21 in such as way as to oppose an extraction of the second end 6b of the fixing piece 6 from the annular groove 21.

It will be noted that, after the snap-fitting, the free distal parts 610b to 630b of the longitudinal fins 61b to 63b can penetrate only partially into the annular groove 21. This makes it possible, for example, to make snap-fitting easier and to facilitate a deliberate withdrawal of the dental prosthesis core 10 from the dental implant 2 (the required inward radial deformation of the free distal parts 610b to 630b of the longitudinal fins 61b to 63b being less). In this case, in order to ensure good fixing of the dental prosthesis core 10 on the dental implant 2, after the second end 6b of the fixing piece 6 has been received in the annular groove 21, a relative movement in translation of the fixing screw 8 toward the proximal end 2a of the dental implant 2 along the first longitudinal axis I-I causes a radial expansion of the second end 6b of the fixing piece 6 (in this case a relative spacing-apart of the free distal parts 610b to 630b of the longitudinal fins 61b to 63b). This radial expansion increases the penetration of the free distal parts 610b to 630b of the longitudinal fins 61b to 63b in the annular groove 21 and thus increases the retention of the dental prosthesis core 10 on the dental implant 2.

It will be seen more particularly from FIG. 7 that the annular groove 21 has a frustoconical proximal portion 21a on which the second end 6b of the fixing piece 6 will come to bear by means of a substantially frustoconical surface 22. Thus, the radial expansion of the second end 6b of the fixing piece 6 induces, along the first longitudinal axis I-I, a pressing of the proximal end 10a of the dental prosthesis core 10 toward the distal end 2b of the dental implant 2.

The first end 6a of the fixing piece 6 is for its part received reversibly in the radial seat 9 with a snap-fit action. Here once again, in order to ensure reversible snap-fitting, use is made of a substantially frustoconical contact surface 23 and of a frustoconical distal portion 9b of the radial seat 9, cooperating in such a way that pulling the fixing piece 6 along the first longitudinal axis I-I away from the proximal end 2a of the dental implant 2 induces a movement (closing together) of the free distal parts 610a to 630a of the longitudinal fins 61a to 63a toward the first longitudinal axis I-I.

To keep the first end 6a of the fixing piece 6 snap-fitted in the radial seat 9, the first end 6a of the fixing piece 6 and the internally threaded insert 5 are configured in such a way that, when the internally threaded insert 5 is bearing axially against the first end 6a of the fixing piece 6, this bearing opposes a withdrawal of the first end 6a of the fixing piece 6 from the radial seat 9. This is obtained again via a frustoconical surface 5c provided at the distal end 5b of the internally threaded insert 5 (see FIG. 2).

It will be noted that, after the snap-fitting, the free distal parts 610a to 630a of the longitudinal fins 61a to 63a can penetrate only partially into the radial seat 9 (which is an annular groove here). This makes it possible, for example, to make snap-fitting easier and to facilitate a deliberate withdrawal of the fixing piece 6 from the dental implant 2 (the required inward radial deformation of the free distal parts 610a to 630a of the longitudinal fins 61a to 63a being less). In this case, in order to ensure good fixing of the fixing piece 6 in the dental implant 2, after the first end 6a of the fixing piece 6 has been received in the radial seat 9, a relative movement in translation of the internally threaded insert 5 toward the distal end 2b of the dental implant 2 along the first longitudinal axis T-T causes a radial expansion of the first end 6a of the fixing piece 6 (in this case a relative spacing-apart of the free distal parts 610a to 630a of the longitudinal fins 61a to 63a). This radial expansion increases the penetration of the free distal parts 610a to 630a of the longitudinal fins 61a to 63a in the radial seat 9 and thus increases the retention of the fixing piece 6 in the dental implant 2.

The first end 6a of the fixing piece 6 also has a substantially frustoconical seat 24 against which the frustoconical surface 5c bears and which is substantially complementary to the frustoconical surface 5c. This complementarity makes it possible to distribute the stresses via surface contact between the internally threaded insert 5 and the first end 6a.

It will be seen more particularly from FIGS. 7 and 8 that the dental prosthesis core 10 comprises a proximal end 10a configured to bear directly against the distal end 2b of the dental implant 2. Since the dental implant 2 and the dental prosthesis core 10 are made of ceramic, this results in a ceramic-on-ceramic contact, which reduces the risks of premature wear.

It will be see from FIG. 7 that the dental prosthesis core 10 has a proximal seat 25, of non-circular cross section, intended to receive, by axial penetration, a distal continuation 26 of the dental implant 2 likewise having a non-circular cross-sectional shape, for example a shape complementing that of the proximal seat 25. The proximal seat 25 and the distal continuation 26 are configured in such a way as to form means 27 for rotational indexing of the dental prosthesis core 10a and of the dental implant 2 about the first longitudinal axis I-I.

Figure 9:
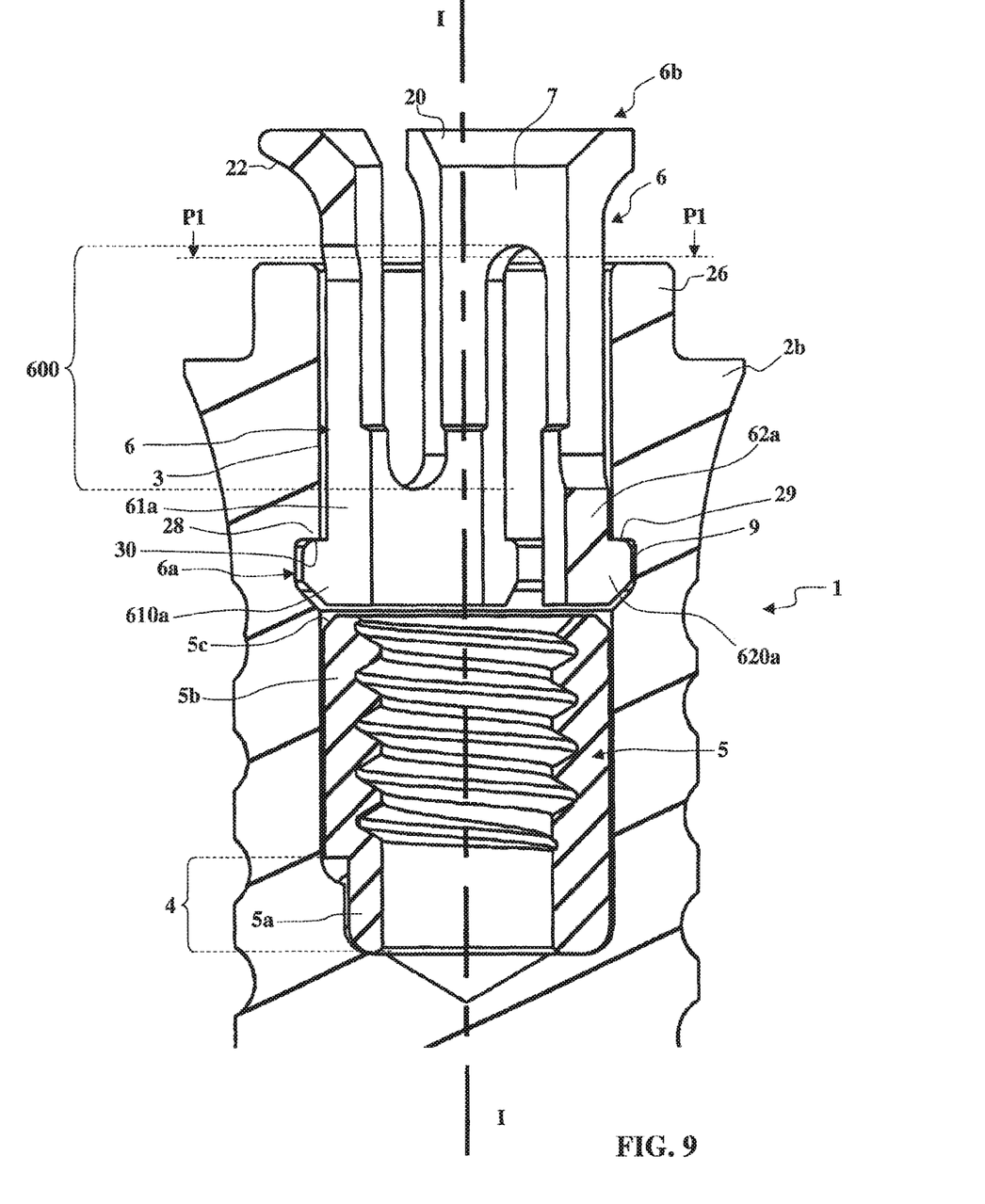
FIG. 9 is a longitudinal sectional view showing a detail of a second embodiment of a set according to the present invention.

The second embodiment of set 1, illustrated in FIG. 9, differs from the first embodiment illustrated in FIGS. 1 to 8 in that the first end 6a of the fixing piece 6 is received in the radial seat 9 in a non-reversible manner.

To do this, the radial seat 9 comprises a distal shoulder 28 having a bearing face 29 perpendicular to the first longitudinal axis I-I. For their part, the free distal parts 610a to 630a of the longitudinal fins 61a to 63a have inner faces defining a bearing surface 30 which is substantially crown-shaped and oriented perpendicularly to the first longitudinal axis I-I.

When the fixing piece 6 is snap-fitted in the dental implant 2, the intermediate axial portion 600 protrudes from the dental implant 2. Thus, in the event of it being necessary to extract the internally threaded insert 5, the fixing piece 6 can be cut off along a plane P1 intersecting the intermediate axial portion 600. The fins 61a to 63a are then detached and can be withdrawn from the dental implant 2.

The protrusion of the intermediate axial portion 600 from the dental implant 2 is also present in the first embodiment, which guarantees a possibility of extraction of the fixing piece 6 if the practitioner does not succeed in unsnapping the first end 6a from the radial seat 9.

In FIGS. 1 to 8, the dental prosthesis core 10 has an outer form substantially in the shape of a tooth, obtained preferably by machining of a ceramic block or produced by sintering of a ceramic powder. A dental prosthesis core 10 of this kind may, if appropriate, be coated by the prosthetist with one or more very light texturing or coloring layers in order to yield an appearance as close as possible to that of a natural tooth.

Alternatively, the dental prosthesis core 10 can be a ceramic block which has a substantially cylindrical or prismatic shape and which is intended to be machined so as to obtain an outer form substantially in the shape of a tooth (as illustrated, for example, in the documents KR 10-2013-0097820, US 2012/0251979 and EP 2 837 357).

An example of use of the first embodiment of set 1 for fixing a dental prosthesis core 10 will now be explained with reference to FIGS. 1 to 8.

The patient has the dental implant 2 from FIG. 1 in his mouth, which dental implant 2 has become osteointegrated at the end of a healing period.

The practitioner begins by introducing the internally threaded insert 5 into the inner connection seat 3 until the portion 5a of non-circular cross section penetrates into the portion 4 of nor-circular cross section. The risk of the internally threaded insert 5 being lost or swallowed is then greatly reduced, on account of its being driven to the very bottom of the inner connection seat 3.

The practitioner then inserts the fixing piece 6 from FIGS. 4 and 5 until the first end 6a thereof snap-fits reversibly in the radial seat 9 in the form of an annular groove. This results in the configuration illustrated in FIG. 6. The fixing piece 6 thus holds the internally threaded insert 5 captive in the inner connection seat 3. There is no risk of losing or swallowing the internally threaded insert 5 and/or the fixing piece 6, which form a single unit.

The practitioner then introduces and begins to screw the fixing screw 8 into the internally threaded insert 5 until the position illustrated in FIG. 7 is reached. The screw head 14 is then spaced apart from the second end 6b of the fixing piece 6 so as not to impede a radial movement of the distal ends 610b to 630b of the longitudinal fins 61b to 63b toward the first longitudinal axis I-I. There is no risk of losing or swallowing the internally threaded insert 5 and/or the fixing piece 6 and/or the fixing screw 8, which form a single unit.

The practitioner can, with complete peace of mind, attach the prosthesis core 10 and arrange it on the implant. 2 in accordance with the movement illustrated by the arrow 17. During this movement, the screw head 14 and the second end 6b engage in the first passage portion 12, and the distal ends 610a to 630a of the longitudinal fins 61a to 63a snap-fit into the annular groove 21. There is no risk of losing or swallowing the internally threaded insert 5 and/or the fixing piece 6 and/or the prosthesis core 10, which form a single unit.

Since the snap-fit actions are reversible, the practitioner can, if necessary, separate the assembled components at any time.

The practitioner then introduces a screwing tool through the second passage portion 13 in order to drive the fixing screw 8 in rotation. During this screwing, the screw head 14 comes into contact with the first end 6a of the fixing piece 6 and opposes any escape of the distal ends 610a to 630a of the longitudinal fins 61a to 63a from the annular groove 21.

As the screwing continues, the internally threaded insert 5 is moved slightly toward the distal end 2b of the dental implant 2 until it comes to bear against the second end 6b. The internally threaded insert 5 opposes any escape of the distal ends 610b to 630b of the longitudinal fins 61b to 63b from the radial seat 9.

As the screwing is continued in order to tension the fixing screw 8, the practitioner produces a slight expansion of the first end 6a (and possibly the second end 6b) of the fixing piece 6, which induces an axial pressing of the proximal end 10a of the dental prosthesis core against the distal end 2b of the dental implant 2. This results in the configuration illustrated in FIG. 8.

The practitioner can finally proceed to stop the orifice of the second passage portion 13 with the aid of a suitable material.

The use of the second embodiment of set 1 illustrated in FIG. 9 is similar to that of the first embodiment. It differs only in that the snap-fit action of the fixing piece 6 is irreversible.

The present invention is not limited to the embodiments that have been explicitly described, and instead it includes the various alternative forms and generalizations thereof contained within the scope of the attached claims.

The invention claimed is:

1. A set of components for dental prosthetic restoration, comprising a ceramic dental implant intended to be fitted in the upper jawbone or lower jawbone of a patient and extending along a first longitudinal axis (I-I) between a proximal end and a distal end, with an inner connection seat extending from the distal end in the direction of the proximal end, in which:

the inner connection seat has at least one portion of non-circular cross section, the set comprises an internally threaded insert, configured in such a way as to be mounted in the portion of non-circular cross section of the inner connection seat of the dental implant by being rotationally indexed therein about the first longitudinal axis (I-I), the set comprises a fixing piece with a first axial through-passage having a cross section of sufficient dimensions for the passage of a threaded element intended to cooperate by screwing with the internally threaded insert, configured to engage in a radial seat formed in the lateral wall of the inner connection seat of the dental implant in such a way as to form an axial abutment opposing an extraction of the internally threaded insert from the portion of non-circular cross section of the inner connection seat, wherein:

the set has a transfixed dental prosthesis core of ceramic comprising a second through-passage formed by first and second successive passage portions, said first passage portion extending from a proximal end of the transfixed dental prosthesis core along a second longitudinal axis (II-II), and said second passage portion continuing the first passage portion in such a way that the first and second passage portions form a non-zero angle (A) between them, the set comprises a fixing screw having a screw head from which there extends a screw shank provided with a threaded portion intended to be received by screwing in said internally threaded insert, the fixing piece extends between a first end, intended to engage in the inner connection seat of the dental implant, and a second end, the first passage portion of the transfixed dental prosthesis core has transverse dimensions permitting reception of the second end of the fixing piece and the screw head by axial penetration along the second longitudinal axis (II-II) from the proximal end of the transfixed dental prosthesis core, the screw head and the second end of the fixing piece are configured so as to cooperate, by radial expansion of the second end of the fixing piece, in order to retain the transfixed dental prosthesis core on the dental implant.

2. The set as claimed in claim 1, wherein the second passage portion of the dental prosthesis core has transverse dimensions which are smaller than those of the first passage portion but which are sufficient for passage of a tool for driving the fixing screw in rotation along the first longitudinal axis (I-I).

3. The set as claimed in claim 1, wherein a relative movement of translation of the fixing screw toward the proximal end of the dental implant along the first longitudinal axis (I-I) causes a radial expansion of the second end of the fixing piece.

4. The set as claimed in claim 1, wherein the dental prosthesis core has an annular groove intended to receive the second end of the fixing piece.

5. The set as claimed in claim 4, wherein a relative movement of translation of the fixing screw toward the proximal end of the dental implant along the first longitudinal axis (I-I) causes a radial expansion of the second end of the fixing piece in order to engage the second end of the fixing piece in the annular groove.

6. The set as claimed in claim 5, wherein the annular groove and/or the second end of the fixing piece have respective contact surfaces which are configured such that the radial expansion of the second end of the fixing piece induces, along the first longitudinal axis (I-I), a pressing of the proximal end of the dental prosthesis core toward the distal end of the dental implant.

7. The set as claimed in claim 4, wherein, when the first passage portion receives the second end of the fixing piece and the screw head by axial penetration along the first longitudinal axis (I-I), the second end of the fixing piece engages in the annular groove reversibly, preferably with a snap-fit action.

8. The set as claimed in claim 7, wherein, after the second end of the fixing piece has been received in the groove, the screw head comes to bear axially against the second end of the fixing piece and opposes an extraction of the second end of the fixing piece from the annular groove.

9. The set as claimed in claim 7, wherein, after the second end of the fixing piece has been received in the groove, a relative movement in translation of the fixing screw toward the proximal end of the dental implant along the first longitudinal axis (I-I) causes a radial expansion of the second end of the fixing piece.

10. The set as claimed in claim 1, wherein:

the first end of the fixing piece has a first set of longitudinal fins with free distal parts, the second end of the fixing piece has a second set of longitudinal fins with free distal parts, the first and second sets of longitudinal fins are defined by a plurality of longitudinal slits extending over only part of the length of the fixing piece and starting alternately from the first end and from the second end, said slits all extending along a same intermediate axial portion of the fixing piece.

11. The set as claimed in claim 1, wherein the first end of the fixing piece is received in the radial seat irreversibly, preferably with a snap-fit action.

12. The set as claimed in claim 1, wherein the first end of the fixing piece is received in the radial seat reversibly, preferably with a snap-fit action.

13. The set as claimed in claim 12, wherein the first end of the fixing piece and the internally threaded insert are configured such that, when the internally threaded insert is bearing axially against the first end of the fixing piece, this bearing opposes a withdrawal of the first end of the fixing piece from the radial seat.

14. The set as claimed in claim 12, wherein a relative movement in translation of the internally threaded insert toward the distal end of the dental implant along the first longitudinal axis (I-I) causes a radial expansion of the first end of the fixing piece.

15. The set as claimed in claim 1, wherein the dental prosthesis core comprises a proximal end configured to bear directly against the distal end of the dental implant.

16. The set as claimed in claim 1, wherein it has means for rotational indexing of the dental prosthesis core and of the dental implant about the first longitudinal axis (I-I).

17. The set as claimed in claim 1, wherein the dental prosthesis core has an outer form substantially in the shape of a tooth, obtained preferably by machining of a ceramic block or produced by sintering of a ceramic powder.

18. The set as claimed in claim 1, wherein the dental prosthesis core is a ceramic block which has a substantially cylindrical or prismatic outer shape and which is intended to be machined so as to obtain an outer form substantially in the shape of a tooth.

* * * * *